United States Patent [19]
Weaver

[11] Patent Number: 5,060,440
[45] Date of Patent: Oct. 29, 1991

[54] ENCAPSULATED WINDOW WITH HINGE
[75] Inventor: William R. Weaver, Toledo, Ohio
[73] Assignee: Libbey-Owens-Ford Co., Toledo, Ohio
[21] Appl. No.: 106,982
[22] Filed: Oct. 5, 1987

Related U.S. Application Data
[63] Continuation of Ser. No. 853,399, Apr. 18, 1986, abandoned.

[51] Int. Cl.$^5$ .............................................. E04B 1/62
[52] U.S. Cl. ....................................... 52/400; 52/403; 52/716
[58] Field of Search ................. 52/398, 399, 716, 397, 52/400, 403

[56] References Cited
U.S. PATENT DOCUMENTS

| | | | |
|---|---|---|---|
| 2,189,137 | 2/1940 | Eichner | 52/399 |
| 2,641,031 | 6/1953 | Ehret | 52/398 |
| 2,898,647 | 8/1959 | Bush et al. | 52/399 |
| 3,866,374 | 2/1975 | Dallen | 52/398 |
| 4,399,644 | 8/1983 | Bright | 52/716 |
| 4,477,507 | 10/1984 | Kunert | 52/716 |
| 4,487,448 | 12/1984 | Griffin | 52/400 |
| 4,489,519 | 12/1984 | Adell | 52/716 |

FOREIGN PATENT DOCUMENTS
565001 10/1958 Canada .................................. 52/399

Primary Examiner—Michael Safavi
Attorney, Agent, or Firm—Marshall & Melhorn

[57] ABSTRACT

A window assembly includes two or more glass sheets and a gasket formed by curing a polymeric gasket material in situ on the glass sheets to encapsulate a marginal peripheral edge thereof and form a hinge between the glass sheets. The hinge is formed as a narrow cross sectional area between portions of the gasket adhered to adjacent peripheral edges of the two glass sheets. The hinge permits the glass sheets to be moved relative to one another. Thus, the glass sheets and gasket can be formed in a substantially planar configuration, can be shipped in said planar configuration, and then can be adjusted to fit into openings in a vehicle or building in a desired configuration.

6 Claims, 1 Drawing Sheet

ENCAPSULATED WINDOW WITH HINGE

This application is a continuation of U.S. Ser. No. 06/853,399, filed Apr. 18, 1986, now abandoned.

BACKGROUND OF THE INVENTION

The present invention relates generally to a window assembly and to a process for producing the assembly, and more particularly to a multi-piece glass assembly for a vehicle including glass sheets connected together by a gasket formed along the edges thereof to permit configuring the assembly to an opening in the vehicle.

Initially, fixed window assemblies for vehicles were comprised of a plurality of elements including adhesive sealants applied around the marginal edges of the glass sheet, suitable mechanical fasteners such as metal clips, and exterior decorative trim strips disposed to cover the junction between the marginal edges of the glass sheet and the adjacent portions of the vehicle frame. Such window structures were costly, especially from a labor standpoint, since it was necessary to assemble the individual elements along the vehicle assembly line.

Subsequently, in an endeavor to improve the above window structure, unitary window assemblies of the type illustrated in U.S. Pat. No. 4,072,340 were developed. These assemblies included a sheet of glass, an adjacent frame, and a casing or gasket of molded material, such as polyvinylchloride, extending between the frame and the peripheral edge of the window to hold the sheet of glass and the frame together. Fasteners were provided at spaced locations along the frame such that the entire assembly could be guided into location over the opening in a vehicle body as a unit. Other types of unitary window assemblies are disclosed in U.S. Pat. Nos. 3,759,004 and 4,364,595. While such unitary window structures greatly reduce the time required to mount the window assembly in the associated vehicle, such structures are relatively costly, since the individual components required to produce each window assembly generally must be manually assembled.

Also, there were endeavors to improve hinged window structures in vehicles. For example, U.S. Pat. No. 4,139,234 discloses a window assembly which includes a molded plastic casing or gasket around the peripheral edge of a transparent window and an attachment member. The attachment member may be a continuous rigid frame concealed from view from the outside of the assembly and having a portion embedded within the casing in a portion extending from the casing by which the entire assembly is secured to the vehicle body. Alternately, separate attaching members can be embedded within the casing. The casing may be molded around only one edge of the window thereby forming a flexible resilient hinge allowing the window to be moved between open and closed positions.

U.S. Pat. No. 4,363,191 discloses a hinged window assembly having a rigid support with a base fastened to the upper side of a window frame and a depending flange with a free edge. An edge molding strip envelops the periphery of a window pane and includes a flexible hinge segment with one portion adhered to the support flange adjacent the free edge thereof to pivotly mount the window pane in the frame.

European Patent Application 0145354, published June 19, 1985 discloses a window gasket assembly in which the gasket is integrally molded from an elastomeric material such as urethane, and at least a portion of which is simultaneously bonded onto at least one substantially transparent window panel. The gasket and window assembly can then be mounted and bonded or secured directly to a vehicle body panel opening with adhesives, thereby eliminating the need for discrete mechanical fasteners, with at least one window panel being hingedly and pivotly attached to the vehicle body panel.

As vehicles become more streamlined, there is an increased demand for curved, fixed glass panels which conform to the body shape. Heretofore, such panels had to be formed of a single sheet of glass and any substantial deviation from flat tended to produce optical distortion.

SUMMARY OF THE INVENTION

The present invention relates to a window assembly and a method of making the same including a mold structure for forming a gasket around a predetermined portion of sheets of transparent material, such as glass, to produce a unitary window assembly. A mold structure that can be employed is shown in detail in U.S. Pat. No. 4,561,625, dated Dec. 31, 1985. This patent is assigned to the assignee of the present application, and is incorporated herein by reference. In the preferred embodiment of the invention, the gasket is formed by curing a polymeric gasket forming material in situ on the glass sheet to encapsulate the marginal peripheral edge portion of the sheet. The gasket is typically formed, for example, of polyurethane by a reaction injection molding process. Such a process is disclosed in U.S. patent application Ser. No. 535,870 entitled "Preformed Window Assembly and Method of Making the Same." This application was filed on Sept. 26, 1983, is assigned to the assignee of the present application, and is incorporated herein by reference.

More specifically, the mold structure includes at least two cooperating mold sections each having a recessed portion formed therein in facing relationship to one another. The recessed portions cooperate to define a sheet receiving chamber for receiving sheets of transparent material such as glass. A compressible seal means is positioned about at least a portion of the periphery of the chamber and functions to resiliently support the glass sheets within the chamber. Each mold section includes a metallic main body portion, and the seal means maintains the glass sheets in spaced-apart relationship with the main body portions of the mold sections to prevent any glass-to-metal contact between the glass sheets and the metallic mold sections.

Also, the seal means cooperates with predetermined portions of the glass sheet and the mold sections for defining a gasket cavity having a configuration corresponding to the gasket to be formed on the glass sheets. The facing surfaces of mold sections disposed outwardly of the gasket forming cavity are in metal-to-metal contact with one another. This enables the amount the seal means is compressed and the dimensions of the gasket to be precisely controlled. Inlet means or gates are provided for introducing a flowable gasket forming material into the gasket cavity.

The window assembly includes two or more sheets of glass connected together by a hinge formed in the gasket by a reduced cross sectional area. The exterior surface of the hinge member is typically coplanar with the exterior surfaces of the adjacent portions of the gasket and the interior surface is recessed to form a generally U-shaped groove. Thus, the window assembly can be installed in a vehicle by bending along the hinge axis to fit the contour of the associated window opening.

BRIEF DESCRIPTION OF THE DRAWINGS

The above, as well as other advantages of the present invention, will become readily apparent to those skilled in the art from the following detailed description of a preferred embodiment when considered in the light of the accompanying drawings, in which.

DESCRIPTION OF THE PREFERRED EMBODIMENT

Figure 1:
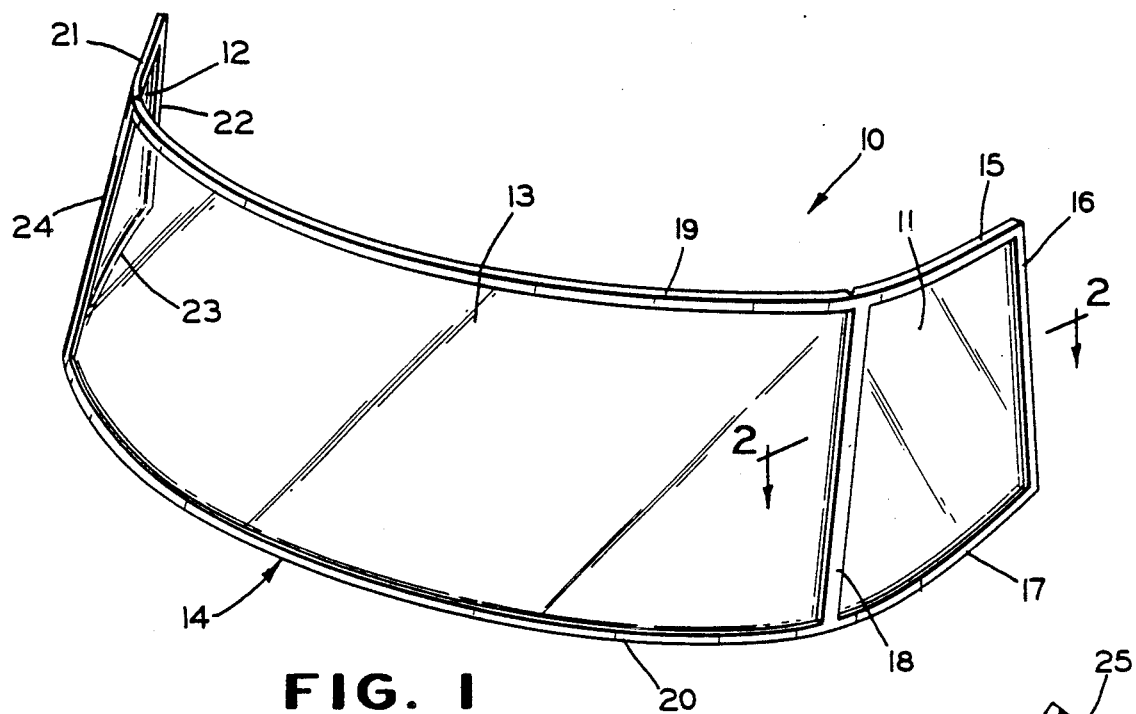
FIG. 1 is a perspective view of a three piece window assembly according to the present invention.

There is shown in FIG. 1 a window assembly 10 according to the present invention, including a pair of side or rear quarter panel windows 11 and 12 joined to either side of a rear window 13. The windows 11, 12 and 13 can be formed of flat or curved sheets of transparent material as shown. In either case, the final configuration of the window assembly 10 shown in FIG. 1 would be difficult if not impossible to achieve utilizing a single sheet of transparent material.

The edges of the windows are encapsulated by a gasket 14 which also forms a hinge connecting the rear window 13 at one side to the side window 11 and at the other side to the side window 12. For example, the side window 11 is encapsulated along a top edge by a top edge portion gasket 15, is encapsulated along one side edge by a side edge portion gasket 16, and is encapsulated along a bottom edge by a bottom edge gasket portion 17. The opposite side edge of the side window 11 is encapsulated by a hinge portion gasket 18 which also encapsulates an adjacent side edge of the rear window 13. The top edge of the rear window 13 is encapsulated by a top edge gasket portion 19 and the bottom edge of the rear window 13 is encapsulated by a bottom edge portion gasket 20. The top edge of the side window 12 is encapsulated by a top edge portion gasket 21, a side edge of the window 12 is encapsulated by a side edge portion gasket 22, and a bottom edge portion gasket 23 encapsulates a bottom edge of the side window 12. The other side edge of the side window 12 is attached to an adjacent side edge of the rear window 13 by a side edge portion gasket 24.

Figure 2:
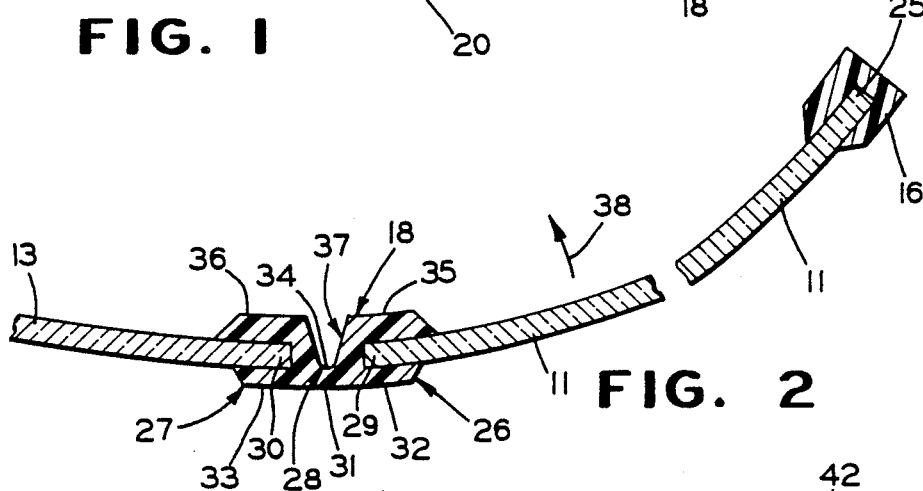
FIG. 2 an enlarged fragmentary sectional view of the window assembly of FIG. 1 taken along the line 2—2 thereof.

As shown in FIG. 2, an enlarged fragmentary cross-sectional view taken along the line 2—2 of FIG. 1, the side edge gasket 16 wraps around and completely encloses a side edge portion 25 of the side quarter panel window 11. The gasket 16 is representative of the gasket portions, 15, 17, 19, 20, 21, 22 and 23. The gasket portion 18 is formed as two edge enclosing portions 26 and 27 joined by a narrow cross section hinge portion 28. The side portions 26 and 27 are similar in cross section to the side portion 16. The side portion 26 encapsulates an edge portion 29 of the side window 11 and the side portion 27 encapsulates an edge 30 of the rear window 13. The hinge portion 18 permits relative angular movement between the side window 11 and the rear window 13 during manufacture, shipping and installation. Thus, the side windows 11 and 12 and the rear window 13 can be formed in separate operations and then assembled together with the molded gasket 14 into a more complex configuration which is easier to install into a vehicle. The gasket 14 also seals against the intrusion of fluid such as wind and rain between the glass windows and the body of the vehicle.

As shown in FIG. 2, the hinge portion 28 is formed with an outer surface 31 which is substantially coplanar with outer surfaces 32 and 33 of the side portions 26 and 27 respectively. An inner surface 34 of the hinge portion 28 is substantially recessed from the inner surfaces 35 and 36 of the side portions 26 and 27 respectively to form a substantially U-shaped groove 37 extending the length of the side edge gasket portion 18. As the side window 11 is moved in the direction of an arrow 38, the groove 37 becomes narrower, but the outer surface 31 remains substantially the same to provide a smooth appearance on the exterior of the vehicle.

Figure 3:
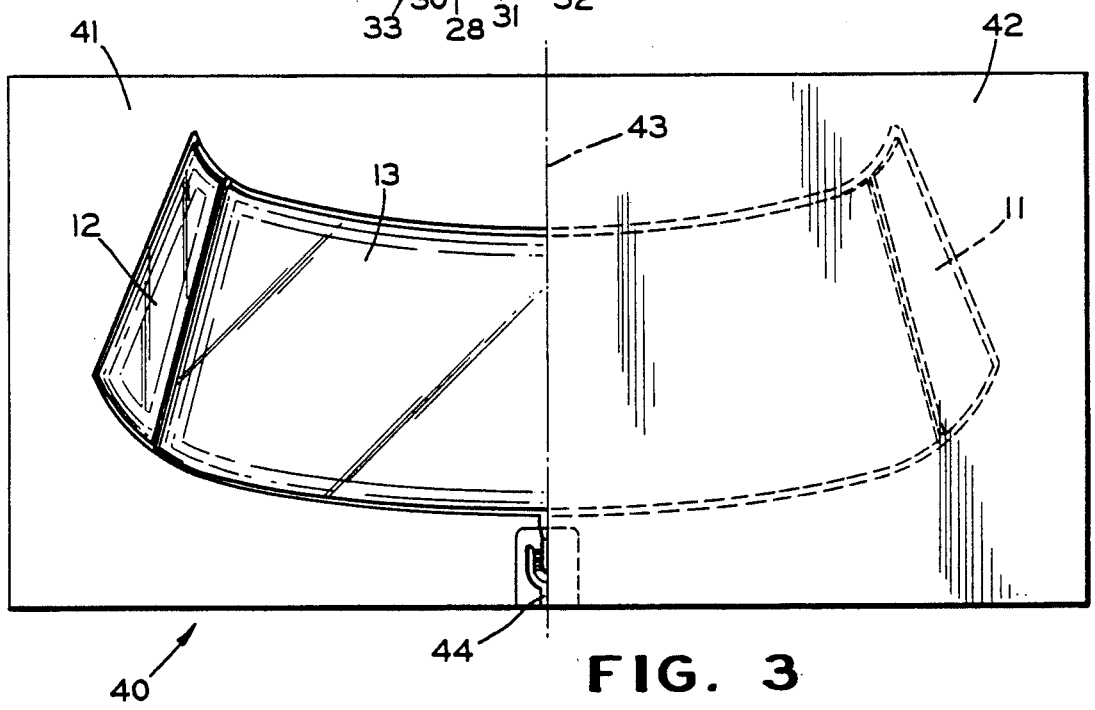
FIG. 3 is a top plan view of a mold structure for fabricating the window assembly of FIG. 1 according to the present invention with a portion of the upper half of the mold cut away.

Referring to FIG. 3, there is shown a mold 40 for making a window assembly in accordance with the present invention. The mold 40 is formed of a lower section 41 and an upper section 42 (half of which has been cut away along a center line 43 for illustration purposes). While the mold sections 41 and 42 are typically formed of a metallic material such as steel or aluminum, for example, other types of substantially non-resilient material can be used. Suitable means, not shown, are provided to open and close the mold sections 41 and 42. Also, each of the mold sections 41 and 42 can be provided with passageways (not shown) for circulating a suitable coolant through the respective mold sections.

The mold sections 41 and 42 are also provided with recessed portions in facing relationship to one another such that, when the mold sections are closed, the recessed portions cooperate to define a sheet receiving or glass clearance chamber for receiving the glass sheets 11, 12 and 13 on which the gasket 14 is to be formed. When the mold sections are open, the glass sheets are positioned on the lower section 41 so that the outer peripheral portion of the lower surface of the glass rests on a resilient lower seal (not shown) positioned within a groove (not shown) formed in the upper surface of the lower section 41. After the glass sheets are suitably positioned on the seal of the lower mold section 41, the upper mold section 42 is lowered into position to enable the outer peripheral portions of the facing surfaces of the cooperating mold sections to be clamped together in a metal-to-metal contact. The upper mold section 42 also carries a resilient upper seal (not shown) positioned in a groove (not shown) formed opposite the groove in the lower section 41. The upper seal cooperates with the lower seal to press yieldingly against the glass sheets and resiliently support the glass sheets within the glass clearance chamber.

The seals, the glass sheets, and the chambers formed in the mold sections 41 and 42 define the gasket forming cavities which are utilized to form the gasket 14. These cavities communicate with an inlet means or a gate 44 for receiving a flowable polymeric gasket forming material from a nozzle member (not shown). Typically, the gasket forming material is adapted to polymerize and cure in situ on the peripheral portions of the glass sheets 11, 12 and 13. The gasket can be formed by a reaction injection molding process utilizing a polyurethane material, for example. Materials which have been utilized to form suitable gaskets include Bayflex 110-80 and Bayflex 110-50 manufactured by Mobay Chemical Corporation of Pittsburgh, Pa.

In accordance with the provisions of the patent statutes, the principle and mode of operation of the present invention have been described in what is considered to represent the preferred embodiment. However, it should be understood that the invention may be practiced otherwise than as specifically illustrated and described without departing from its spirit or scope.

What is claimed is:

1. A window assembly comprising:
    at least a first and second sheet of transparent material; and
    a gasket composed of a synthetic polymer and extending along all of the peripheral edge portions of said first and second sheets of transparent material and adhered to said sheets of transparent material, said gasket including a first member extending along a first portion of the peripheral edge of said first sheet, a second member extending along a first portion of a peripheral edge of said second sheet, and a third member connecting said first and second members of said gasket, said third member having an external surface coplanar with an external surface of each of said first and second members and having an internal surface recessed with respect to an internal surface of each of said first and second members to define a generally U-shaped groove in said gasket extending substantially the entire length of said third member, said third member functioning as a hinge to permit angular displacement of said first and second sheets of transparent material relative to one another about the axis of the U-shaped groove so as to allow the window assembly to be installed to fit contours in an associated window opening, and wherein said gasket has been polymerized in situ adjacent with first portions of the peripheral edges of said first and second transparent sheets and having assumed through the autogenous mechanism incident to its polymerization and cure while confined, intimate contact with the portions to which it is adhered.

2. The window assembly according to claim 1 wherein said first and second sheets of material are glass.

3. The window assembly according to claim 1 wherein said gasket is formed of an elastomeric material.

4. The window assembly according to claim 3 wherein said elastomeric material is a polyurethane material.

5. The window assembly according to claim 1 and including a third sheet of transparent material, said gasket including a fourth member extending along a portion of the peripheral edge of said third transparent sheet, a fifth member extending along a portion of another peripheral edge of said second transparent sheet and a sixth member connecting said fourth and fifth members and having a narrower cross section than said fourth and fifth members to permit relative movement between said second and third transparent sheets.

6. The window assembly according to claim 5 wherein said sixth member has an external surface coplanar with an external surface of each of said fourth and fifth members and has an internal surface recessed with respect to an internal surface of each of said fourth and fifth members to form a generally U-shaped groove in said gasket to define said narrower cross-section sixth member.

* * * * *